Patented Nov. 24, 1936

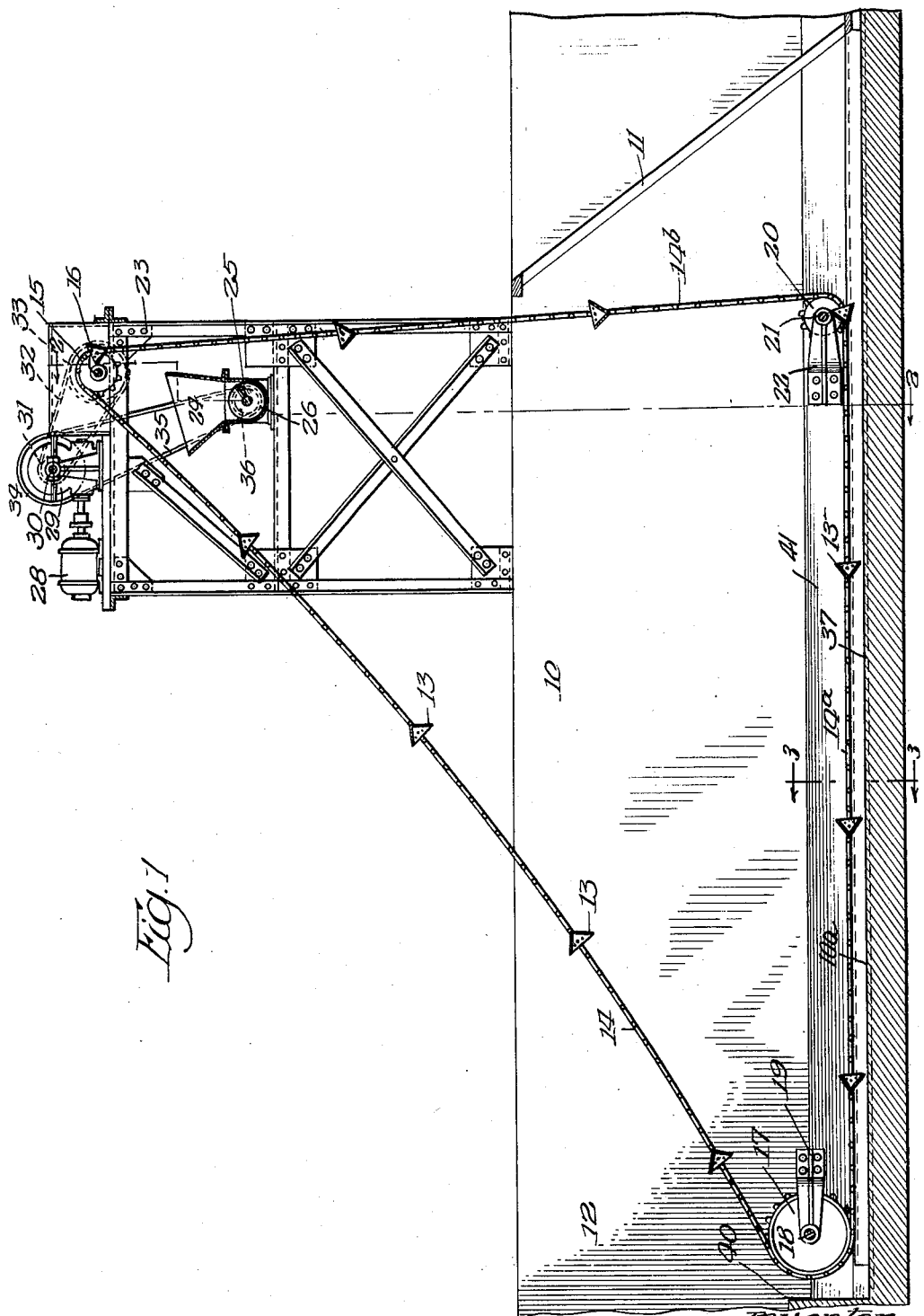

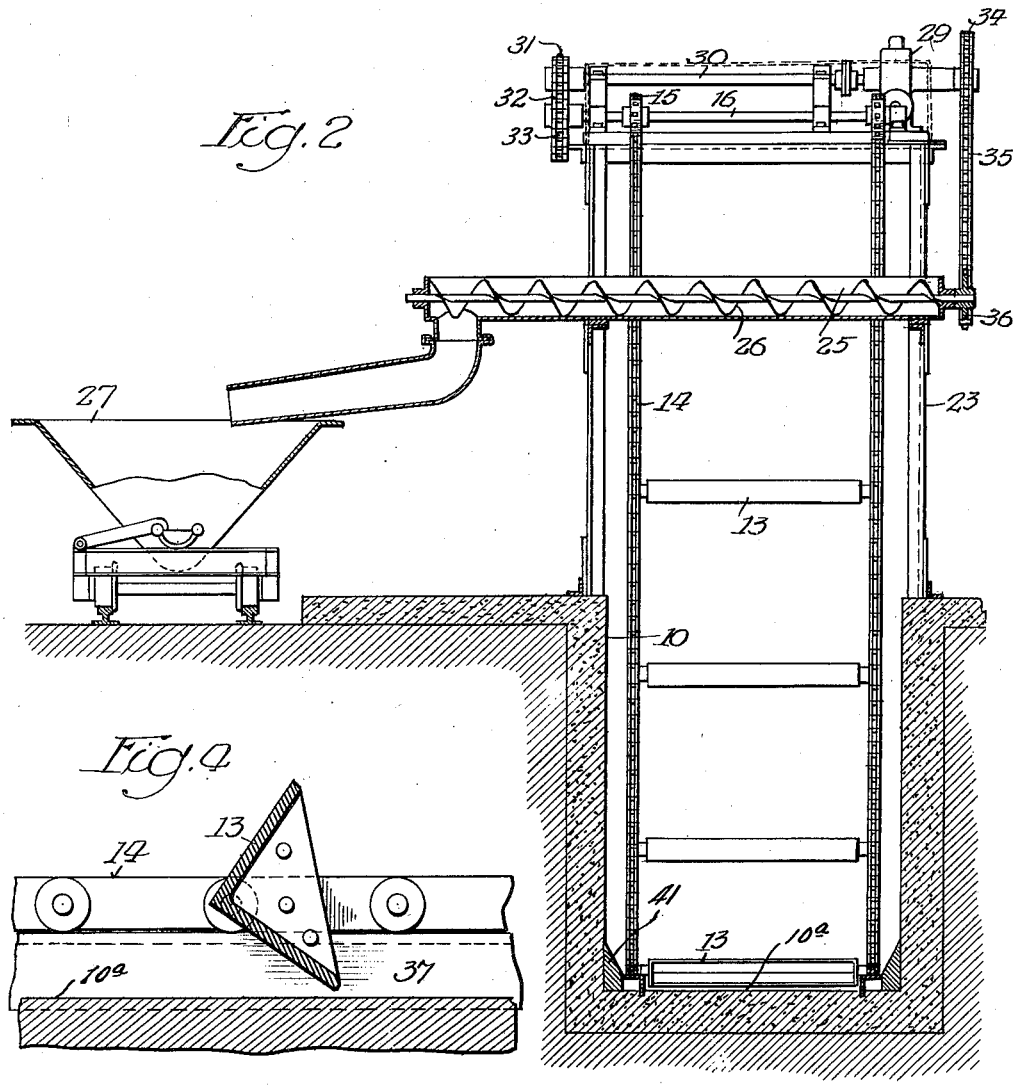
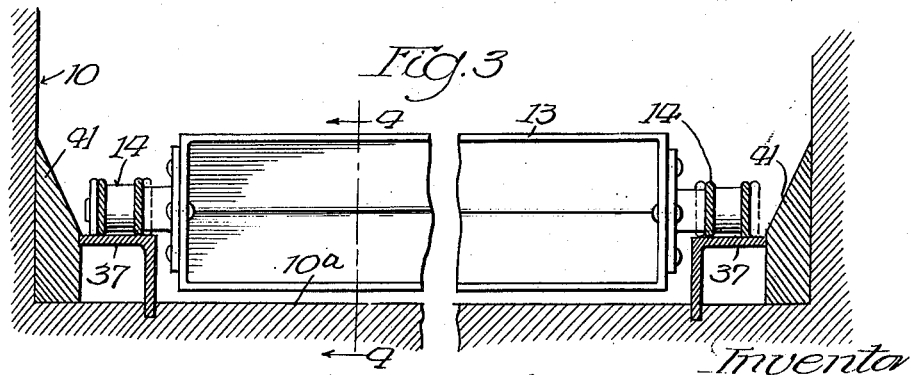

2,061,841

UNITED STATES PATENT OFFICE 2,061,841

SEWAGE DISPOSAL APPARATUS

William H. Lang, Chicago, Ill., assignor to The Webster Manufacturing Company, Chicago, Ill., a corporation of Ohio Application September 21, 1933, Serial No. 690,426

3 Claims. (Cl. 210—3)

The invention relates generally to sewage disposal and more particularly to the removal of grit and inorganic matter from the sewage and its recovery for use.

One object of the invention is to provide an apparatus which comprises new and improved means for separating the grit from the sewage independently of the organic matter in suspension, and also comprises simple means for washing the grit so it will be adapted for use.

Other objects of the invention and the various advantages and characteristics of the present apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views: Fig. 1 is a longitudinal section of an apparatus embodying the invention. Fig. 2 is a vertical section of the apparatus on the line 2—2 of Fig. 1. Fig. 3 is an enlarged transverse section on the line 3—3 of Fig. 1. Fig. 4 is a section on the line 4—4 of Fig. 3.

The apparatus which forms the subject matter of the invention comprises a channel 10 through which sewage is adapted to flow in transit to the usual settling or other chambers for purification. The sewage flows through the channel 10 at a sufficient velocity to keep the organic matter in suspension and to carry it to the purifying or settling chambers. Initially the sewage encounters a coarse or bar screen 11 which is adapted to retain all large pieces of material in the sewage. If desired, automatic raking mechanism (not shown) may be provided to remove the material caught by the screen. The outlet 12 of this channel is connected to deliver the sewage to the settling or other chambers in which the sewage is treated.

A baffle 40 over which the sewage flows to the outlet 12 is disposed in the channel 10 immediately behind the grit removing conveyor presently to be described. The organic matter in suspension is carried through the channel over the baffle 40, while the heavier material, such as grit, settles on the bed 10ª of the channel 10 before the sewage reaches the baffle 40.

In addition to the channel 10 the apparatus comprises a conveyor for removing the grit from the channel while the sewage is passing therethrough. This conveyor consists of a pair of endless chains 14, and a series of V-shaped buckets 13 mounted on and between the chains. These chains pass around drive-sprockets 15 on an elevated shaft 16; around idler sprockets 17 which are mounted adjacent the bottom of the channel 10 and near the outlet 12 on a cross-shaft 18 which is mounted in brackets 19 which are fixed to the side-walls of the channel 10; and around a pair of sprockets 20 on a cross-shaft 21 which is mounted in brackets 22 which are fixed to said side walls of the channel. Sprocket-wheels 17 and 20 are disposed adjacent the bottom of the channel 10, so that there will be a straight reach 14ª of the conveyor along the bed of the channel, which will cause the buckets 13 to travel in parallelism with the bottom and to scrape the grit off the bed of the channel. The drive-shaft 16 and sprockets 15 are suitably mounted in an elevated supporting structure 23 which is built above the channel 10 so as to provide between sprockets 20 and 15 a reach 14ᵇ of the conveyor which leads upwardly and slightly at an angle to the vertical. In this reach, the grit in the buckets will be elevated from the bottom of the channel and through the stream of sewage. While the buckets are traversing the reach 14ᵇ, they will be slightly tilted to drain the major portion of the liquid from the grit, one side-wall of each bucket being then lower than the other for that purpose. The buckets, after passing around the sprockets 15, will be inverted to discharge the grit into a hopper 24 which directs the grit into a cross-chute 25 which contains a screw-conveyor 26 for conducting the grit laterally to discharge it into a car 27 or any suitable vehicle for transporting the grit to its point of use.

Angle iron bars 37 are anchored in the bed of the channel 10 and extend longitudinally of the horizontal reach 14ª of the bucket conveyor to form rails on which the chains 14 ride, to guide the buckets 13 so their lower edges will travel over and slightly spaced from the bed. The buckets 13 are V-shaped, and in travelling over the bed 10ª, their lower sides will deflect or scoop the grit into the buckets. These buckets travel in a direction opposite to the flow of the sewage, and this causes the water in the sewage adjacent the bottom, to rinse or wash the grit in transit to the elevating reach of the conveyor. As the buckets 13 are moving upwardly after leaving sprockets 20, they will travel so the side-walls at one side will be lower than the other, so that the major portion of the water in the buckets will overflow that side and pass back into the channel. In this manner, the conveyor serves to rinse or wash the grit preparatory to removing it from the channel so that it will be in condition for use without further washing. Strips 41, with inclined top surfaces are placed on the bed 10a between the side-walls of the channel and the bars 37, to deflect the grit into the space traversed by the buckets 13.

The conveying mechanism is driven from a motor 28 on the top of the supporting structure 23, by gearing comprising a speed-reduction unit 29, a cross-shaft 30 which drives a sprocket-wheel 31 to drive, through a chain 32, a sprocket wheel 33 on the drive-shaft 16 of the grit elevator and conveyor. A sprocket-wheel 34 on shaft 30 drives through a chain 35, a sprocket-wheel 36 on the shaft of the screw 26 which conveys the grit transversely through chute 25.

In operation, the sewage flows through the channel 10 at a suitable velocity to keep the organic matter in suspension. The screen 11 arrests the large material in the sewage. After passing through the screen, the inorganic matter of heavy specific gravity in the sewage is deposited on the bed 10a of the channel along the horizontal reach of the conveyor. The buckets 13 scoop the grit into their apices and travel counter to the flow, so the current will rinse or wash the grit in the buckets, and will tend to hold the grit therein. After passing around sprockets 20, the buckets will be tipped slightly to pour off the liquid back into the channel. Next, the grit will be discharged into hopper 24 as the buckets pass over sprockets 15. The screw 26 and chute 25 deliver the grit into the car 27 for transportation to the place of use or storage. As the empty buckets pass downwardly and backwardly from sprockets 15 to sprockets 17, the flow of sewage is against the V-shaped bottoms of the buckets so the organic matter will be deflected to keep the buckets clear.

The invention exemplifies a simple and efficient apparatus for separating the grit from sewage and recovering it for use.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a sewage disposal apparatus of the character described, the combination with a comparatively narrow channel along which sewage is adapted to flow in one direction, of an endless conveyor comprising buckets and a chain and embodying a substantially horizontal reach adapted to travel longitudinally over the bed of the channel in a direction opposite to the flow of sewage through said channel, and having the buckets thereof fixedly connected to the links of the chain in such manner that during travel in said horizontal reach they face sidewise in the direction of travel of said reach and operate to pick up the grit deposited on the bed of the channel and permit the liquid portion of the sewage to wash and rinse the bucketed grit, said conveyor also embodying an upstanding reach for elevating the grit loaded buckets out of the channel and a downwardly extending return reach whereby the buckets are caused to be inverted for grit discharging purposes, a member associated with the upper end of said downwardly extending return reach of the conveyor for receiving the discharged grit, and power means for driving the conveyor so that the horizontal reach thereof travels oppositely to said sewage flow.

2. In sewage disposal apparatus of the character described, the combination with a comparatively narrow channel along which sewage is adapted to flow in one direction, of an endless conveyor comprising buckets and side chains and embodying a substantially horizontal reach adapted to travel longitudinally over the bed of the channel in a direction opposite to the flow of sewage through said channel, and having the buckets thereof fixedly connected to the links of the chains so that during travel in said horizontal reach they face sidewise in the direction of travel of said reach and operate to pick up the grit deposited on the bed of the channel and permit the liquid portion of the sewage to wash and rinse the bucketed grit, said conveyor also embodying an upstanding reach for elevating the grit loaded buckets out of the channel and a downwardly extending return reach whereby the buckets are caused to be inverted for grit discharging purposes, a conveyor supporting structure extending above the channel and provided with a platform adjacent the upper end of the substantially vertical reach, a cross conveyor on the structure for receiving the discharged grit, and mechanism for conjointly driving the bucket conveyor and the cross conveyor comprising a motor mounted on said platform.

3. In a sewage disposal apparatus of the character described, the combination of a comparatively narrow channel along which sewage is adapted to flow in one direction, of an endless conveyor comprising buckets and side chains and embodying a horizontal reach adapted to travel longitudinally over the bed of the channel in a direction opposite to the flow of sewage through said channel and also embodying a substantially vertical reach at the front end of the horizontal reach and a downwardly inclined return reach between the upper end of the vertical reach and the other or rear end of the horizontal reach, the buckets of said conveyor being substantially V-shaped in cross-section and fixedly connected to the links of the chains so that the apex or bottom portions thereof are aligned with the chain links and their inner side portions extend to one side of the links and their outer side portions extend to the other side of said links and further so that during travel thereof in the horizontal reach they face sidewise in the direction of travel of said horizontal reach and are tilted slightly upwards with respect to the chain links and thus operate to pick up the grit deposited on the bed of the channel and permit the liquid portion of the sewage to wash and rinse the bucketed grit, and during travel in said vertically extending reach they are tilted slightly towards the inclined reach and permit of drainage back into the channel of any liquid sewage therein, means associated with the upper end of said return reach of the conveyor for catching the grit as it is discharged by the buckets as they pass into said last mentioned reach, and power means for driving the conveyor so that the horizontal reach thereof travels oppositely to said sewage flow.

WILLIAM H. LANG.